United States Patent [19]
Widauer et al.

[11] 3,846,411
[45] Nov. 5, 1974

[54] CHOLERETICALLY ACTIVE ESTERS AND SALTS OF BILE ACIDS

[75] Inventors: Josef Olav Widauer, Allschwil, Switzerland; Konrad Lang, Bad Krozingen, Germany; Laszlo Baum; Suzanne Szabo, both of La Tour-de-Peilz, Switzerland

[73] Assignee: Medichemie A.G., Basel, Switzerland

[22] Filed: July 17, 1972

[21] Appl. No.: 272,156

[30] Foreign Application Priority Data
Aug. 4, 1971   Switzerland.................. 11484/71
Sept. 28, 1971  Switzerland.................. 14085/71
Jan. 24, 1972   Switzerland.................. 1012/72

[52] U.S. Cl.......... 260/239.5, 260/112.5, 260/397.1
[51] Int. Cl........................................... C07c 173/10
[58] Field of Search........... 260/397.1, 327 A, 239.5

[56] References Cited
UNITED STATES PATENTS
2,562,350   7/1951   Burtner.......................... 260/397.1
2,763,645   10/1956  Bloom............................ 260/239.5
3,534,070   10/1970  Aonuma et al.................. 260/397.1

*Primary Examiner*—Elbert L. Roberts
*Attorney, Agent, or Firm*—Stevens, Davis, Miller & Mosher

[57] ABSTRACT

Choleretically active esters and salts of bile acids having the formula

I 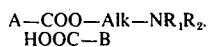 II 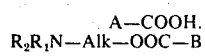

in which A—COO— is the rest of a bile acid; B—COO— is the rest of an acid which cooperates choleretically with a bile acid; Alk is an ethylene, propylene or isopropylene group, and $R_1$ and $R_2$, which are identical or different, represent a hydrogen atom or a lower alkyl group or together with the nitrogen atom form a heterocyclic ring which can contain another nitrogen or oxygen atom and which can be substituted with alkyl groups. Among the bile acids which are particularly useful are cholic acid, deoxycholic acid, chenodeoxycholic acid, dehydrocholic acid and lithocholic acid. The acid B can e.g., be one of the following acids: 1,2-dithiolan-3-valeric acid or a cinnamic acid such as e.g. 3-methoxy-4-hydroxycinnamic acid; or further orotic acid; a sulfur containing amino acid, such as cystein or methionin; or arginin.

5 Claims, No Drawings

CHOLERETICALLY ACTIVE ESTERS AND SALTS OF BILE ACIDS

This invention concerns choleretically active esters and salts of bile acids.

According to the present invention, these acids and salts have the following formula:

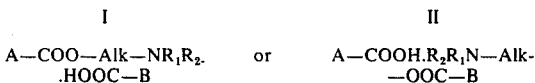

in which A—COO— is the rest of a bile acid; B—COO— is the rest of an acid which cooperates choleretically with a bile acid; Alk is an ethylene, propylene or isopropylene group, and $R_1$ and $R_2$, which are identical or different, represent a hydrogen atom or a lower alkyl group or together with the nitrogen atom form a heterocyclic ring which can contain another nitrogen or oxygen atom and which can be substituted with alkyl groups.

Among the bile acids which particularly useful are cholic acid, deoxycholic acid, chenodeoxycholic acid, dehydrocholic acid and lithocholic acid.

The acid B can e.g., be one of the following acids: 1,2-dithiolan-3-valeric acid of the formula

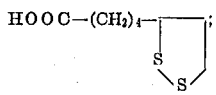

a cinnamic acid of the general formula

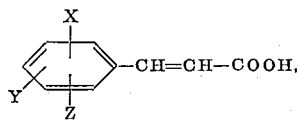

in which X, Y and Z, which can be identical or different, represent a hydrogen atom, a hydroxyl, lower alkyl or lower acyloxy group or a halogen atom, such as e.g., 3-methoxy-4-hydroxy-cinnamic acid; 3-methoxy-4-acetoxy-cinnamic acid or 2-methoxy-5-bromo-cinnamic acid; or further orotic acid; a sulfur containing amino acid, such as cystein or methionin; or arginin.

In the above formula I the basic group —Alk—$NR_1R_2$ is a part of an ester of a bile acid, whilst according to formula II this basic group is a part of another acid, that is an acid which contains group B. Such esters can be prepared from the corresponding amino alcohol by a known esterification procedure.

The salts of formula I and II can be prepared in known manner by reacting a basic ester or its acid addition salt with the desired acid or one of its salts in an appropriate solvent. One can e.g., react in known manner, in a suspension, a dialkylaminoalkyl ester of dehydrocholic acid with a substituted cinnamic acid and heat the mixture to the boiling point, so that a clear solution is obtained. After cooling, the desired salt cristallizes out; it is filtered off after some hours, washed and dried. The yield is between 80 and 95 percent.

One can carry out this salt forming reaction in an appropriate organic solvent at its boiling point. Impurities can be filtered off from the hot solution. After cooling, the salt cristallizes out. It can also be obtained by evaporation in cristallized form.

The use of the bile acids, as well as their inorganic salts and esters, as choleretic agents, is already known. Equally, choleretic activity of the cinnamic acids has been described by M. Pesson, J. Salle, C. Auffret, Arch. Int. Pharmacodyn. CXXIX. 443–481 (1959).

There has now been found, according to the present invention, that the present esters, respectively salts, show an unexpectable synergistic action in their choleretic activity.

The assays were effectuated on male rats largely according to the methods and techniques as described by G. Czok in the Supplement to Zeitschrift fuer Ernaehrungswissenschaft, Nr. 5, pages 32–33, 1966.

The amounts of bile obtained have been measured volumetrically. Then the bile was dried in an oven and the dry weight measured. On a comparative basis, control groups of animals were utilized in which these animals were treated with equimolar or equivalent quantities of 3-methoxy-4-hydroxy-cinnamic acid and dehydrocholic acid.

The results of these pharmacological assays show that the substances according to formula I or II substantially increase not only the flow of bile but also the amount of solid components of the bile, measured in the dry residue.

If one utilizes the experimental values which have been measured with respect to those two parameters for 3-methoxy-4-hydroxy-cinnamic acid and dehydrocholic acid, each taken alone, in order to compare the effects with the tested substances, one finds that certain of the aforesaid substances, among those of the chemical class here described, are able to enhance substantially the action of the bile of the two control substances, by about 4 to 5 times the bile flow and by about 8 to 9 times the dry residue.

On the basis of the preceding experimental values, one can conclude that the substances of formulae I and II can be utilized with success for the treatment of disorders of the liver and of the bile tract.

The new substances of formulae I and II also present a choleretic action and a protective action on the liver.

EXAMPLES

1. A suspension of 250 ml of absolute ethyl alcohol and 47.4 g (0.1 mole) of the dimethylaminoethylester of dehydrocholic acid is reacted with a solution of 19.7 g (0.1 mole) of 3-methoxy-4-hydroxy-cinnamic acid in 250 ml of ethyl alcohol. The reaction mixture is shortly heated to reflux, so that a clear yellow solution is obtained. After cooling, the 3-methoxy-4-hydroxy-cinnamate of the dimethylaminoethyl ester of dehydrocholic acid cristallizes out in colourless crystals, which are filtered after some hours by vacuum, washed with cold ethyl alcohol and dried at 50°C in vacuo. One recovers 54.8 g of the formed salt, whose decomposition point lies between 165° and 170°C; yield 82 percent.

2. According to example 1, the 3-methoxy-4-acetoxy-cinnamate of the dimethyl-amino-ethyl ester of dehydrocholic acid is obtained with a yield of 86 percent. Its decomposition point lies after recristallization six times between 140° and 143°C, after six recristallizations from ethyl alcohol.

3. According to example 1, one can obtain the 3-methoxy-4-hydroxy-cinnamate of the diethylaminoethyl ester of dehydrocholic acid in a 90 percent yield. The decomposition point of the colourless crystals is 147°–150°C.

4. According to example 1, the 3-methoxy-4-acetoxy cinnamate of the diethylaminoethyl ester of dehydrocholic acid was synthetized with a yield of 85 percent. Decomposition point: 157°–160°C.

5. According to example 1, the 2-methoxy-5-bromo-cinnamate of the dimethylaminoethyl ester of dehydrocholic acid was obtained from the dimethyl-aminoethyl ester of dehydrocholic acid and 2-methoxy-5-bromo-cinnamic acid with a yield of 80 percent.

6. According to example 1, one can synthetize from the diethylaminoethyl ester of dehydrocholic acid and 2-methoxy-5-bromo-cinnamic acid the 2-methoxy-5-bromo-cinnamate of the diethylaminoethyl ester of dehydrocholic acid.

7. 25 g of the diethylaminoethyl ester of dehydrocholic acid (0.05 mole, are suspended in 100 ml of absolute ethanol and stirred and reacted with a solution of 10.5 g of 1,2-dithiolanvaleric acid (0.05 mole) in 50 ml of ethanol. The mixture is heated to reflux, so that a yellow solution is obtained. It is filtered hot and the solvent evaporated in vacuum. The cristalline residue is diluted with 50 ml of isopropylether and filtered by vacuum, washed with 20 ml isopropylether and dried at 50°C in vacuo. One obtains 28.7 g of light yellow crystals whose decomposition point lies between 180° and 184°C.

8. According to example 7, the 1,2-dithiolan-3-valerate of the dimethylaminoethyl ester of dehydrocholic acid is obtained with a yield of 88 percent.

9. 5.1 g of the dimethylaminoethyl ester of dehydrocholic acid (0.01 mole) are dissolved in 100 ml of water at room temperature. This colourless clear solution is reacted with a solution of 2.3 g sodium 1,2-dithiolan-3-valerate (0.01 mole) in 10 ml of water. The 1,2-dithiolan-3-valerate of the dimethylaminoethyl ester of dehydrocholic acid separates out in the form of a light yellow mass, which in a short time becomes a cristalline powder. After a few hours the substance is filtered, washed with water and dried in an exsiccator. One thus obtains 4.8 q of light yellow crystals, whose decomposition point lies between 182° and 186°C.

10. According to the method of example 9, the 1,2-dithiolan-3-valerate of the dimethylaminopropyl ester of cholic acid is obtained from the dimethylaminopropyl ester of cholic acid and 1,2-dithiolan-3-valeric acid.

11. According to example 9, the 1,2-dithiolan-3-valerate of the dimethylaminoisopropyl ester of deoxycholic acid is obtained from the dimethylaminoisopropyl ester of deoxycholic acid hydrochloride and sodium 1,2-dithiolan-3-valerate.

12. According to example 9, the diisopropylaminoethyl ester of lithocholoic acid and 1,2-dithiolan-3-valeric acid give the 1,2-dithiolan-3-valerate of the diisopropylaminoethyl ester of lithocholic acid.

13. to 20 In the same way as described above one can obtain the following salts:
Cinnamate of the dimethylaminoethyl ester of dehydrocholic acid,
  (colourless crystals, decomposition point: 158°–160°C) -
Orotate of the dimethylaminoethyl ester of dehydrocholic acid -
1,2-dithiolan-3-valerate of the dimethylaminopropyl ester of cholic acid -
2-methoxy-5-bromo-cinnamate of the dimethylaminopropyl ester of cholic acid -
1,2-dithiolan-3-valerate of the diisopropylaminoethyl ester of deoxycholic acid -
Methionate of the diisopropylaminoethyl ester of deoxycholic acid -
1,2-dithiolan-3-valerate of the (2-morpholino)-ethyl ester of lithocholic acid -
Cysteinate of the (2-morpholino)ethylester of lithocholic acid.

21. 16.8 g (0.05 mole) of the diethylaminoethyl ester of 3-methoxy-4-acetoxy-cinnamic acid are dissolved in 150 ml of absolute ethyl alcohol. One adds 20.1 g (0.05 mole) of dehydrocholic acid to this solution and heats the mixture to the boiling point, thus obtaining a clear solution. After cooling, the dehydrocholate of the diethylaminoalkyl ester of 3-methoxy-4-acetoxy-cinnamic acid cristallizes out. The raw product is filtered by vacuum after a few hours, washed with ethyl alcohol and dried in vacuo. One obtains 32.3 g of the desired salt, whose decomposition point lies between 168° and 169°C after recristallization from ethyl alcohol.

22. 6.0 g (0.02 mole) of the diethylaminoethyl ester of 3-methoxy-4-hydroxycinnamic acid are dissolved in 30 ml of chloroform and reacted with a suspension of 3 g of dehydrocholic acid in 80 ml of chloroform. The mixture is heated to reflux, the solution is filtered to remove the possible impurities and evaporated in vacuo. The residue is taken up with diisopropyl ether, filtered, washed with ether and dried in vacuum. One obtains 12.8 g of light yellow crystals, whose decomposition point lies between 102° and 105°C; yield 91.5 percent.

23. to 26. According to examples 21 and 22, the following substances of formula II are obtained:
Dehydrocholate of the dibutylamino-isopropyl ester of 3-methoxy-
4-acetoxy-5-bromocinnamic acid -
Cholate of the dimethylamino-isopropyl ester of 3-methoxy-4-
acetoxycinnamic acid -
Deoxycholate of the 2-(N'-methyl-piperazino)ethyl ester of 2-
methoxy-5-bromocinnamic acid -
Chenodeoxycholate of the 2-(N'-methyl-piperazino)ethyl ester of 2-methoxy-5-bromocinnamic acid.

We claim:
1. Choleretically active salts of basic bile acid esters and cinnamic acids of the general formula

$$\text{I} \quad A-COO-Alk-NR_1R_2HOOC-CH=CH-\underset{Z}{\overset{X}{\underset{}{\bigodot}}}Y$$

in which A—COO— is the rest of a bile acid having the formula of a cholanic acid with hydroxyl or oxo substitutents in at least one of the 3,7 or 12 positions, the hydroxyl groups being at the same face of the steroid molecule; X, Y, and Z, which are identical or different, represent a hydrogen atom, a hydroxyl, a lower alkyl or a lower acyloxy group, or a halogen atom; Alk is an ethylene, propylene or isopropylene group, and $R_1$ and $R_2$, which are identical or different, represent a hydrogen atom or a lower alkyl group or together with the nitrogen atom form a piperazino, N-methyl piperazino or morpholino group.

2. Salts according to claim 1, wherein the bile acid is cholic acid, deoxycholic acid, chenodeoxycholic acid, dehydrocholic acid or lithocholic acid.

3. Salts according to claim 1, wherein the cinnamic acid is 3-methoxy-4-hydroxy-cinnamic acid.

4. Salts according to claim 1, wherein the cinnamic acid is 3-methoxy-4-acetoxy cinnamic acid.

5. Esters and salts according to claim 1, wherein the cinnamic acid is 2-methoxy-5-bromo-cinnamic acid.

* * * * *